United States Patent [19]

Miyoshi

[11] 4,390,246

[45] Jun. 28, 1983

[54] ELECTROCHROMIC DEVICE BY OBLIQUE EVAPORATION TO IMPROVE THE RESPONSE OF COLORATION AND BLEACHING

[75] Inventor: Taisuke Miyoshi, Tokyo, Japan

[73] Assignee: Kabushiki Kaisha Daini Seikosha, Tokyo, Japan

[21] Appl. No.: 953,596

[22] Filed: Oct. 23, 1978

[51] Int. Cl.³ ............................................... G02F 1/17
[52] U.S. Cl. ................................................... 350/357
[58] Field of Search ........................... 350/357; 29/570

[56] References Cited

U.S. PATENT DOCUMENTS 3,704,057 11/1972 Beegle .................................. 350/357

Primary Examiner—James W. Davie
Attorney, Agent, or Firm—Robert E. Burns; Emmanuel J. Lobato; Bruce L. Adams

[57] ABSTRACT

An electrochromic device includes a layer of electrochromic material, such as tungsten oxide, which is deposited by oblique evaporation at an acute angle of incidence in the range of from 10° to 90° between the normal to the substrate and the direction of the evaporation. Due to the anisotropic topography achieved by the oblique evaporation, the layer of electrochromic material exhibits improved fast response and long life time of cycling of coloration and bleaching.

14 Claims, 2 Drawing Figures

ELECTROCHROMIC DEVICE BY OBLIQUE EVAPORATION TO IMPROVE THE RESPONSE OF COLORATION AND BLEACHING

BACKGROUND OF THE INVENTION

This invention relates generally to electrochromic devices, and more particularly to an electrochromic device in which the electrochromic layer is deposited by a technique known as oblique evaporation.

Electrochromic devices are well-known devices which exhibit a phenomenon known as "persistent electrochromism", e.g. see U.S. Pat. No. 3,521,941 entitled, "Electro-Optical Device Having Variable Optical Density", issued July 28, 1970. The term "persistent electrochromism" denotes the property of a material whereby its electromagnetic radiation absorption characteristic is altered, in most instances, even at ambient temperature, under the influence of an electric field. Such materials, for example, may exhibit little or no absorption of visible wavelength in the absence of an electric field and therefore be transparent, but when subjected to an electric field, effectively absorb in the red end of the spectrum, turning blue in color. Similar effects can be observed in other portions of the electromagnetic spectrum, invisible as well as visible.

Although electrochromic devices have been developed and are successful for many applications, the use of electrochromic materials has been discouraged since many electrochromic devices have a slow response of coloration and bleaching and a short life time of cycling of coloration and bleaching.

It is therefore an object of this invention to provide an electrochromic device which has a fast response and a long life time of cycling of coloration and bleaching.

These and other objects of the invention will become apparent as the description thereof proceeds.

SUMMARY OF THE INVENTION

An electrochromic device includes a substrate and a first electrode on the substrate. A layer of electrochromic material is disposed on the first electrode and an electrolyte is disposed on the layer of electrochromic material. A second electrode is disposed on the electrolyte. The layer of electrochromic material is deposited by oblique evaporation such that the response of coloration and bleaching is fast.

DETAILED DESCRIPTION OF THE INVENTION

Figure 1:
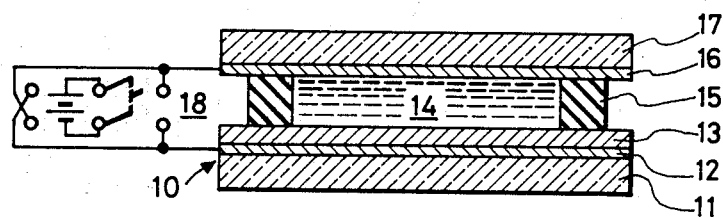
FIG. 1 is a cross-sectional schematic view of one form of electrochromic display device according to the present invention.

Referring initially to FIG. 1, an electrochromic display device of the present invention is generally designated by reference numeral 10. The device includes a transparent substrate 11, e.g., glass, and a first transparent electrode 12, e.g., tin doped indium oxide, on the substrate 11. A layer 13 of electrochromic material is deposited on the first electrode 12. In accordance with the present invention, the layer 13 of electrochromic material is deposited by the oblique evaporation technique.

An electrolyte 14, such as sulfuric acid, lithium perchlorate in propylene carbonate or lithium nitride, is placed in contact with a surface of the layer 13 of electrochromic material. The electrolyte 14 is partially contained by a spacer 15. It is preferable that the spacer 15 be of a material which is inert with respect to the electrochromic environment of the device 10, e.g., a plastic. A second electrode 16 is disposed in contact with the electrolyte 14 such that the electrolyte 14 is completely contained within the spaced defined by the layer 13 of electrochromic material, the spacer 15, and the second electrode 16. The second electrode 16 may comprise gold film deposited on a substrate 17, e.g., glass or ceramic. A conventional electrical biasing network 18 is provided to enable one to selectively reverse the electrical biasing such that one polarity will produce coloration of the layer 13 of electrochromic material while the opposite polarity will cause bleaching, as is well known in the art.

The electrochromic device of FIG. 1 can be constructed by methods well known in the art. The layer 13 of electrochromic material, according to the invention, is deposited by oblique evaporation whereas the conventional layers of electrochromic material are deposited by evaporation at normal incidence.

Figure 2:
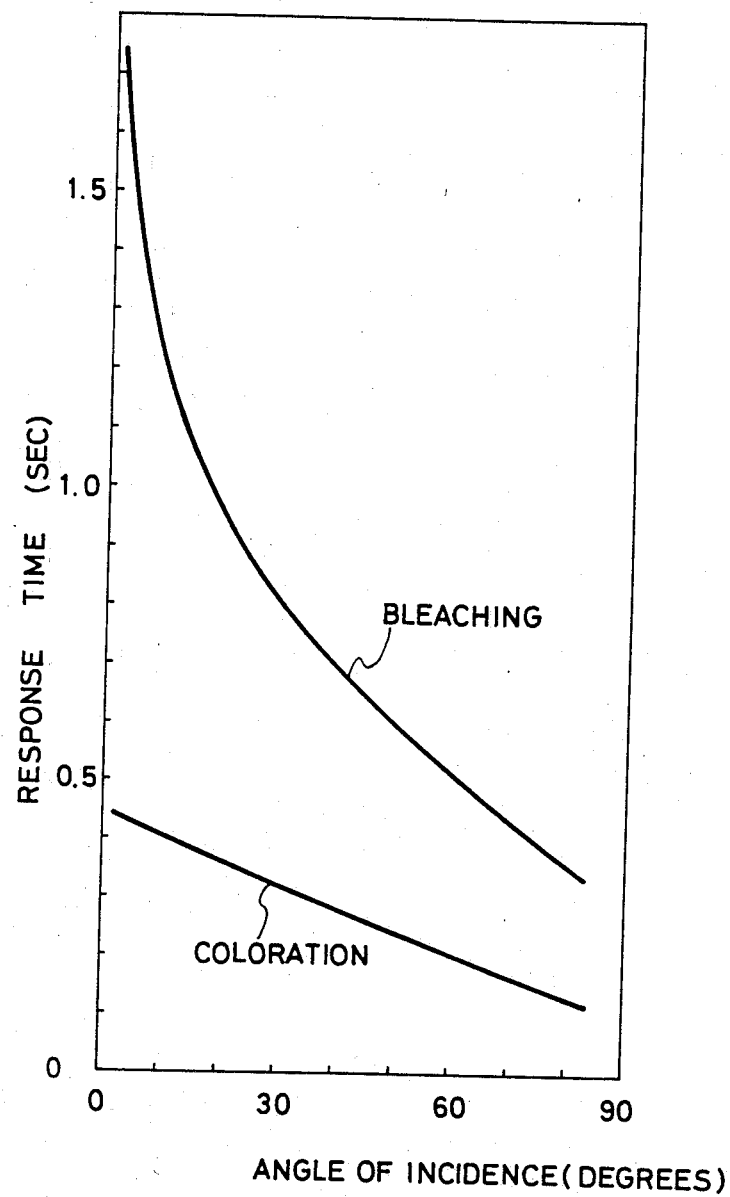
FIG. 2 is a graph showing the response time of coloration and bleaching of the layer of electrochromic material as a function of the angle of incidence of evaporation.

The response time of coloration and bleaching of the layer of electrochromic material versus the angle of incidence between the normal to the substrate and the direction of the evaporation is shown in FIG. 2. Response time of coloration and bleaching is measured in the following manner. The reflectance of the layer of electrochromic material decreases as the charge passes the layer of electrochromic material and the reflectance of the light from a halogen lamp is measured by a photomultiplier through a filter designed so as to correspond to a visibility curve. Response time denotes the time required for the reflectance of the layer of electrochromic material to change to 45% from the uncolored state in the coloration process and to change to 80% from 45% in the bleaching process. As shown in FIG. 2, the response time of the layer of electrochromic material deposited at normal incidence (0 degrees) is longer than those of the layers of electrochromic material deposited obliquely. Especially the bleaching response time of the layer of electrochromic deposited at normal incidence is very long.

As can be observed from FIG. 2, when the angle of incidence increases at which the layer of electrochromic material is deposited, the response time decreases. Thus the layer of electrochromic material deposited by the oblique evaporation in accordance with the present invention has improved fast response time of both coloration and bleaching.

The coloration mechanism in the electrochromic material is not thoroughly understood but in the case that the electrochromic material is tungsten oxide ($WO_3$), the coloration process is believed to occur according to the simultaneous injection of electrons and positive ions into the colorless tungsten oxide, thereby forming a so-called "tungsten bronze" according to the following reaction

where $M^+$ is a positive ion.

The reason why the response is improved in accordance with the present invention is theorized as follows.

The obliquely deposited films exhibit anisotropic topography. The self-shadowing mechanism was first proposed by König and Helwig, and van de Waterbeemed and van Oosterhout formulated a theory for the growth of obliquely deposited films that includes not only the effect of geometric shadowing but also the effect of atomic mobility of the shape and the development of the columns. As observed experimentally on silicon oxide films by L. A. Goodman et al., the growth in obliquely deposited films seems rowlike columnar arrays. Therefore in an electrochromic device the layer of electrochromic material with columnar structure of the present invention has much larger surface area in contact with the electrolyte than the conventional layer of electrochromic material, thereby it is thought to be reasonable that because a large number of positive ions are injected into and extracted from the layer of electrochromic material in unit time, the color change is very fast.

When evaporated at the angle of incidence smaller than about 10°, the deposited film seems not to have the property of columnar structure. Therefore it is thought to be reasonable that the response time of the layer of electrochromic material evaporated at the angle of incidence smaller than about 10° is relatively long.

The following examples illustrating particularly applications of the present invention and are not to be construed as a limitation of the invention.

EXAMPLE 1

A layer of electrochromic material was prepared as follows: Tungsten oxide was obliquely evaporated onto the transparent electrode, about 0.02 μm thick film of tin doped indium oxide, on the glass substrate. The angle of incidence between the normal to the substrate and the direction of the evaporation was selected in the range of from 10° to 90°. The thickness of the layer of deposited tungsten oxide was about 0.1 μm to 0.5 μm.

EXAMPLE 2

An electrochromic device was constructed from two glass plates. One glass plate was coated with a 0.02 μm thick transparent electrode film of tin doped indium oxide on which a 0.5 μm thick layer of tungsten oxide was deposited by oblique evaporation at an angle of 60°. The other glass plate was coated with a first 0.1 μm thick evaporated chromium film and a second 0.2 μm thick evaporated gold film. The glass plates so formed were pressed together with the layer of tungsten oxide and the gold film facing each other but separated by a 0.5 mm thick sealing spacer which retained an ionically conductive paste consisting of a $TiO_2$ pigment in a 1 M lithium perchlorate in propylene carbonate.

This device was cycled from color to bleach and back to color at an applied potential of 1.5 volts D.C. The response times of coloration and bleaching were about 0.2 sec and 0.5 sec respectively. The device underwent 2,000,000 cycles of switching at 20 cycles per minute without any degradation.

EXAMPLE 3

An electrochromic device was constructed from two glass plates. One glass plate was coated with a 0.02 μm thick transparent electrode film of tin doped indium oxide on which a 0.25 μm thick layer of tungsten oxide was deposited by oblique evaporation at an angle of 40°. The other glass plate was coated with a first 0.1 μm thick evaporated chromium film and a second 0.2 μm thick evaporated gold film. The glass plates so formed were pressed together with the layer of tungsten oxide and the gold film facing each other but separated by a 0.5 mm thick sealing spacer which retained an ionically conductive paste consisting of a $TiO_2$ pigment in a 1 M lithium perchlorate in propylene carbonate. This device was cycled from color to bleach and back to color at an applied potential of 1.5 volts D.C..

The response times of coloration and bleaching were about 0.3 sec and 0.7 sec respectively. The device underwent 2,000,000 cycles of switching at 20 cycles per minute without any degradation.

I claim:

1. In an electrochromic device of the type having a substrate, a first electrode disposed on the substrate, a layer of electrochromic material disposed on the first electrode, an electrolyte disposed on the layer of electrochromic material, and a second electrode disposed on the electrolyte, the improvement comprising: said layer of electrochromic material having anisotropic topography formed by depositing by evaporation said electrochromic material such that the direction of evaporation makes an acute angle with respect to the normal to said substrate.

2. An electrochromic device according to claim 1; wherein said layer of electrochromic material having anisotropic topography comprises a film deposited by the evaporation of electrochromic material with the angle of incidence between the normal to the substrate and the direction of the evaporation in the range of from 10° to less than 90°.

3. An electrochromic device according to claim 1; in which said electrolyte comprises an acid.

4. An electrochromic device according to claim 3; in which said acid comprises sulfuric acid.

5. An electrochromic device according to claim 1; in which said electrolyte comprises a salt.

6. An electrochromic device according to claim 5; in which said salt comprises lithium perchlorate.

7. An electrochromic device according to claim 1; in which said electrolyte comprises an ionic conductive compound.

8. An electrochromic device according to claim 7; in which said ionic conductive compound comprises lithium nitride.

9. An electrochromic device according to claim 1; wherein said layer of electrochromic material comprises tungsten oxide.

10. An electrochromic device according to claim 1; wherein the thickness of said layer of electrochromic material is in the range of from about 0.1 μm to 0.5 μm.

11. An electrochromic device according to claim 1 or 2; wherein said layer of electrochromic material having anisotropic topography comprises rowlike columnar arrays of electrochromic material which make an acute angle with respect to the normal to said substrate.

12. In an electrochromic device of the type having a substrate, a first electrode disposed on the substrate, a layer of electrochromic material disposed on the first electrode and operable to undergo cycles of coloration and bleaching during use of the electrochromic device, an electrolyte disposed on the layer of electrochromic material, and a second electrode disposed on the electrolyte, the improvement comprising: said layer of electrochromic material having an anisotropic topography effective to speed up the response time of coloration and bleaching as compared to electrochromic material of the same composition having isotropic topography.

13. An electrochromic device according to claim 12; wherein said layer of electrochromic material comprises a film deposited by the evaporation of electrochromic material at a direction of evaporation which makes an acute angle in the range of from 10° to less than 90° with respect to the normal to said substrate.

14. An electrochromic device according to claim 12 or 13; wherein said layer of electrochromic material having anisotropic topography comprises rowlike columnar arrays of electrochromic material which make an acute angle with respect to the normal to said substrate.

* * * * *